No. 625,474. Patented May 23, 1899.
W. E. SKINNER.
DIPPING VAT.
(Application filed Sept. 24, 1898.)
(No Model.)
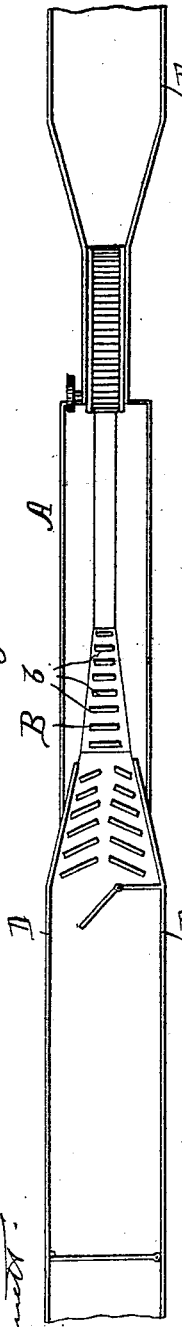
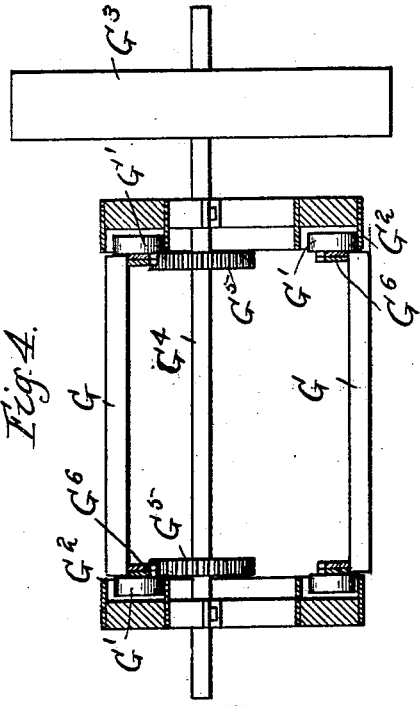
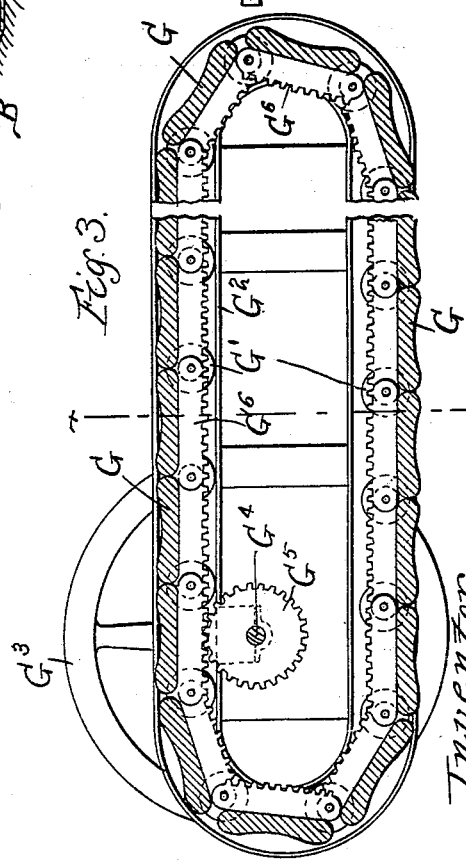

UNITED STATES PATENT OFFICE.

WILLIAM E. SKINNER, OF FORT WORTH, TEXAS.

DIPPING-VAT.

SPECIFICATION forming part of Letters Patent No. 625,474, dated May 23, 1899.

Application filed September 24, 1898. Serial No. 691,775. (No model.)

*To all whom it may concern:*

Be it known that I, WILLIAM E. SKINNER, a citizen of the United States, residing at Fort Worth, county of Tarrant, State of Texas, have invented a certain new and useful Improvement in Dipping Vats or Tanks; and I declare the following to be a full, clear, and exact description of the invention, such as will enable others skilled in the art to which it pertains to make and use the same, reference being had to the accompanying drawings, which form a part of this specification.

My invention has for its object the production of a dipping-vat and accompanying apparatus whereby cattle can be submerged in a suitable liquid solution for the purpose of killing the disease germs which may be in or on the hide.

To that end it consists of a combination of devices and appliances to be hereinafter more fully described and claimed.

In the drawings, Figure 1 is a plan view of my apparatus. Fig. 2 is a vertical section thereof, and Fig. 3 is a longitudinal section showing the carrier. Fig. 4 is a section on the line 4 4 of Fig. 3.

In carrying out the invention A represents the vat proper. This may be constructed of any desirable material and may of course be any size and proportion desired. This vat is filled to a suitable height, preferably a height sufficient to submerge the animal completely, with the solution which it is desired to apply to the animal. One end B of the vat is inclined and preferably provided with cleats $b$ or the like, whereby the animal can easily mount.

C represents what may be termed the "drip-floor." It is preferably provided with cleats inclined slightly toward the center, so that as the animal drips the liquid will be carried to the center of the floor and back down into the vat.

D represents suitable fences or the like constituting a pen, and from this pen the animal can be taken to the point desired.

E represents the floor of the chute leading to the vat. It can be suitably fenced in by the fences F.

In order that the animals can be handled with sufficient rapidity to make it commercially profitable to use this device, it is desirable that the inlet-chute should be provided with some automatic means for forcing the animal into the vat. I have therefore constructed my apparatus with the end of the inlet-chute at considerable of an elevation above the bottom of the tank and at an elevation above the surface of the liquid in the tank. The bottom of this inlet-chute is arranged at an angle, as shown, and is preferably provided with some sort of movable carrier device. One form of carrier which is practicable is shown in the drawings and is made up of a series of slats G, connected together at each end to form an endless chain and provided with antifriction-wheels $G'$, traveling in the tracks $G^2$, so that when the animal steps onto the slats its weight will carry it down toward the tank and all efforts on the part of the animal to back off will only tend to carry the animal down farther. To regulate the speed of the carrier, I provide a brake-wheel $G^3$, mounted on the shaft $G^4$, the latter carrying a pinion $G^5$, which meshes with the rack $G^6$. A brake can be applied to the wheel $G^3$, and this regulates the speed of the carrier.

It is obvious that the details of the construction might be varied in many ways without departing from the spirit of the invention, which consists, essentially, in the provision of a vat, an inlet-chute, and means in connection with the inlet-chute for precipitating the animal from the chute into the vat.

What I claim is—

1. The combination with the tank and the inlet-chute, of an inclined carrier device located in said chute for precipitating the animal into the tank, said device operated by the weight of the animal substantially as described.

2. The combination with the tank and the inlet-chute, of an endless carrier device located in said chute for precipitating the animal into the tank, said device operated by the weight of the animal substantially as described.

In testimony whereof I sign this specification in the presence of two witnesses.

WILLIAM E. SKINNER.

Witnesses:
   WALTER H. CHAMBERLIN,
   GEO. H. WELESTRIP.